US005954375A

United States Patent [19]
Trickle et al.

[11] Patent Number: 5,954,375
[45] Date of Patent: Sep. 21, 1999

[54] SANITARY FITTING HAVING FERRULE WITH GROOVED UNDERCUT

[75] Inventors: Glen W. Trickle, Elm Grove; Peter S. Planton, Muskego, both of Wis.

[73] Assignee: Edstrom Industries, Inc., Waterford, Wis.

[21] Appl. No.: 08/902,191

[22] Filed: Jul. 29, 1997

Related U.S. Application Data

[63] Continuation-in-part of application No. 08/576,259, Dec. 21, 1995, Pat. No. 5,655,797.

[51] Int. Cl.⁶ ........................................................ F16L 21/04
[52] U.S. Cl. ........................ 285/342; 285/382.7; 285/354
[58] Field of Search ..................................... 285/341, 342, 285/343, 382.7, 354, 399

[56] References Cited

U.S. PATENT DOCUMENTS

| 193,993 | 8/1877 | Pennie . |
|---|---|---|
| 2,158,757 | 5/1939 | Kuestermeier . |
| 2,179,127 | 11/1939 | Lauer . |
| 2,251,717 | 8/1941 | Parker . |
| 2,330,841 | 10/1943 | Parker . |
| 2,469,851 | 5/1949 | Stecher et al. . |
| 2,478,149 | 8/1949 | Wolfram et al. . |
| 2,531,922 | 11/1950 | Seamark . |
| 2,644,700 | 7/1953 | Woodling . |
| 2,670,223 | 2/1954 | Ream . |
| 2,757,943 | 8/1956 | Henderson . |
| 2,912,262 | 11/1959 | Franck . |
| 3,135,537 | 6/1964 | Scott . |
| 3,186,740 | 6/1965 | Lee . |
| 3,290,069 | 12/1966 | Davis . |
| 3,312,484 | 4/1967 | Davenport . |
| 3,468,566 | 9/1969 | Nietzel . |
| 3,485,517 | 12/1969 | Howe . |
| 3,787,080 | 1/1974 | Daniel ...................................... 285/341 |
| 3,879,070 | 4/1975 | Russ . |
| 4,309,050 | 1/1982 | Legris ...................................... 285/341 |
| 4,516,794 | 5/1985 | Zorb et al. . |
| 4,635,975 | 1/1987 | Campbell . |
| 4,740,019 | 4/1988 | Casimir et al. .......................... 285/341 |
| 5,005,875 | 4/1991 | Harle . |
| 5,028,078 | 7/1991 | Schwartz et al. ................. 285/382.7 X |
| 5,308,122 | 5/1994 | Crawford et al. . |

FOREIGN PATENT DOCUMENTS

| 39 02 642 A1 | 8/1990 | Germany . |
|---|---|---|
| 617048 | 1/1949 | United Kingdom . |
| 2 113 788 | 8/1983 | United Kingdom . |

*Primary Examiner*—H. Shackelford
*Attorney, Agent, or Firm*—Nilles & Nilles, S.C.

[57] ABSTRACT

A sanitary fitting provides a fluid-tight seal between the fitting and the axial end of the tube coupled to the fitting, thereby eliminating crevices between the end of the tube and the sealing point of the fitting and consequent fluid accumulation and potential bacteria growth. The fitting preferably includes a body having a recessed outer end, an elastomeric seal disposed in the recess in the body, a gripping ring slidable into a stepped notch formed in the outer end of the body, and a locking mechanism which grips the tube and which draws the tube into a position in which its end sealingly engages the seal and causes the seal to sealingly engage an annular shoulder of the body. The gripping ring, body, and tube interact to provide very high retention forces permitting the fitting to withstand fluid pressures on the order of several thousand psi. The locking mechanism includes a ferrule having a grooved undercut near its inner end that in use facilitates collapsing of the ferrule's inner end into gripping contact with the tube.

16 Claims, 6 Drawing Sheets

SANITARY FITTING HAVING FERRULE WITH GROOVED UNDERCUT

CROSS REFERENCE TO A RELATED APPLICATION

This application is a continuation-in-part of U.S. patent application Ser. No. 08/576,259, filed Dec. 21, 1995 and entitled "SANITARY FITTING", now U.S. Pat. No. 5,655,794.

BACKGROUND OF THE INVENTION

1. Field of the Invention

The invention relates to fittings and, more particularly, to sanitary fittings for connecting together sections of rigid metal tubes for conveying liquids under sanitary conditions. The invention additionally relates to an improved ferrule usable in a sanitary fitting and to a sanitary fitting incorporating the improved ferrule. The invention also relates to a method of assembling a sanitary fitting using an improved ferrule.

2. Discussion of the Related Art

Fittings are well-known for connecting together sections of metal pipes or tubes. Threaded fittings and compression fittings are the most commonly used for this purpose because they are relatively reliable and relatively inexpensive to fabricate and install.

Figure 1:
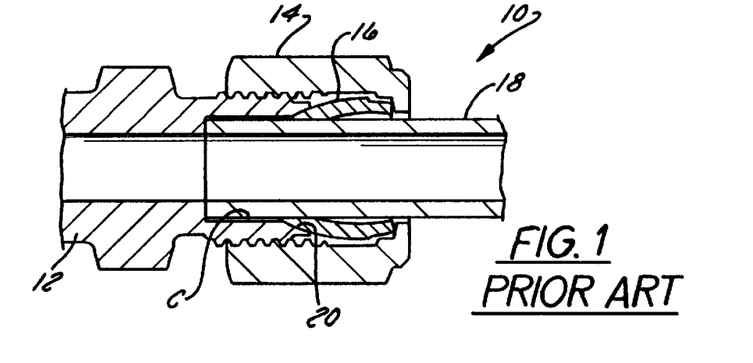
FIG. 1 is a sectional elevation view of a prior art compression fitting, appropriately labeled "Prior Art"

Referring to FIG. 1, a conventional swaglok-type compression fitting 10 includes a recessed body 12, a locking nut 14, and a gripping ring 16. The recessed body 12 receives the end of a tube 18, and the gripping ring 16 is disposed between the end of the body 12 and an outer flange of the nut 14. In use, as the nut 14 is threaded onto the body 12, fingers on the end of the gripping ring 16 are forced into a wedged-shaped end portion 20 of the body 12 so as to grip the tube 18 and to seal against both the tube 18 and against the end portion 20 of the body 12.

The fitting 10 exhibits several drawbacks and disadvantages rendering it poorly suited for use in systems requiring sanitary operating conditions. For instance, because the actual seal point between the gripping ring 16, the tube 18, and the body 12 is located remote from the end of the tube 18, a relatively large crevice C is present in the fitting. Fluids may collect in this crevice, promoting bacterial growth.

Threaded joints are considerably stronger than compression joints. However, voids are formed between the threads which are even larger than the crevices formed in compression fittings. Fluid accumulation and bacteria growth therefore are even more problematic in fittings having threaded joints than in those having compression joints.

Sanitary fittings are available which are designed to eliminate crevices in the vicinity of the end of the tube, but all previously known sanitary fittings exhibit certain drawbacks and disadvantages.

Figure 2:
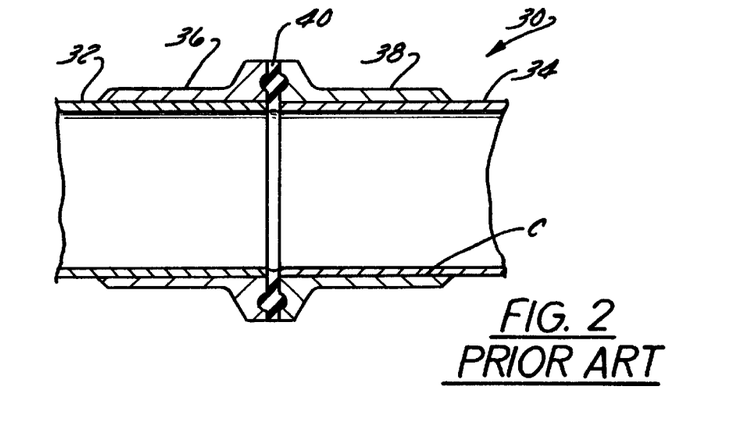
FIG. 2 is a sectional elevation view of a prior art role-on ferrule sanitary fitting, appropriately labeled "Prior Art"

Referring for instance to FIG. 2, one type of sanitary fitting 30 employs a "roll-on" ferrule as the sealing portion of the fitting. Specifically, tubes 32, 34 to be joined are expanded into grooves formed on the inner periphery of ferrules 36, 38 using rollers. A gasket 40 is placed between the ferrules 36, 38, and the ferrules 36, 38 are forced towards one another, using a clamp or threaded nut (not shown) to compress the gasket therebetween. When the fitting 30 is properly assembled, the ends of the tubes 32, 34 are sealed to the gasket 40 to eliminate voids or crevices between the tubes 32, 34 and the gasket 40 and to prevent fluid accumulation and bacteria growth.

The roll-on ferrule fitting 30 exhibits several drawbacks and disadvantages. For instance, it is relatively difficult to assemble because the ends of the tubes 32, 34 must be expanded into contact with the ferrules 36, 38 as part of the assembly process. Moreover, unless the gasket 40 is perfectly positioned to seal against the ends of the tubes 32, 34 rather than against the ends of the ferrules 36, 38, leakage can occur, particularly during temperature cycling, due to the formation of crevices C' between the ferrules 36, 38 and the tubes 32, 34 as a result of temperature differentials between the ferrules and the tubes. Even if the crevices C' do no extend across the axial length of the interface between the tube 32, 34 and the ferrules 36, 38, fluids still may accumulate in the crevices C', thereby leading to unsanitary conditions and promoting bacterial growth.

Figure 3:
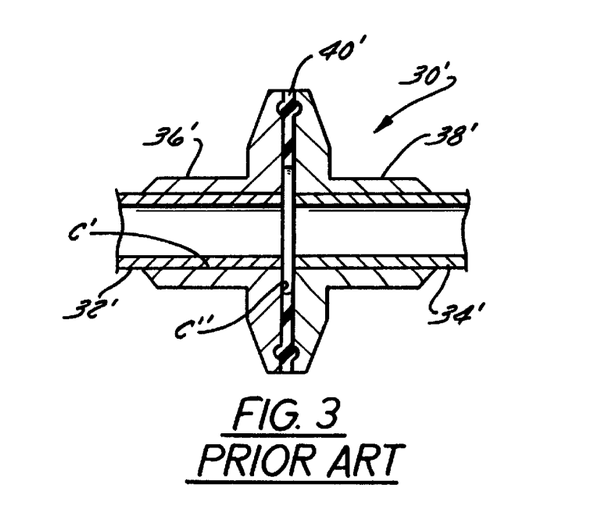
FIG. 3 is a sectional elevation view corresponding to FIG. 2 and illustrating the inability to use a sanitary fitting of the type illustrated in FIG. 2 with small diameter tubes.

Referring to FIG. 3, structural constraints prohibit the use of roll-on ferrule-type fittings 30' with tubes 32', 34' having a diameter below 1 inch OD because the gasket 40', required to provide proper alignment between the adjacent tubes 32' and 34', is not available below 1 inch in size. Accordingly, if one were to attempt to use this style of fitting with tubes of relatively small size, i.e., ½ inch, a major crevice C" is formed at the ferrule 36, 38 which promotes fluid accumulation and bacterial growth. Of course, the potential still exists for the formation of the crevice C' as discussed above in connection with FIG. 3 and the accompanying disadvantages.

While other sanitary fittings are known, some of which solve one or more of the problems discussed above, all are relatively expensive to manufacture, and many are not easily usable with cut lengths of standard tubing.

Another problem associated with many fittings is that they fail at relatively low pressures because the holding forces applied to the tubes are relatively weak. For instance, U.S. Pat. No. 2,158,757 to Kuestermier discloses a fitting in which the tube is held in place by a gripping ring. The gripping ring has an annular portion spaced from the tube and a plurality of identical finger portions sloping inwardly and downwardly to terminate closely adjacent the outer wall of the tube. The fingers grip the tube when the fitting is assembled and locked in place, thereby preventing movement of the tube relative to the fitting. However, the combined area of the fingers is somewhat smaller than the combined area of the gaps between the fingers, and only the tips of the fingers grip the tube. Accordingly, very high stresses are imposed on these fingers, even at relatively low pressures. When the pressure in the tube exceeds a relatively low threshold, the fingers will buckle or bend back over themselves and allow the tube to be forced out of the fitting under fluid pressure therein. Experiments and manufacturers' specifications have revealed that most fittings of this type fail at pressures on the order of 200–500 psi.

Another problem associated with many fittings is that standard ferrules used with such fittings are poorly-suited for gripping the copper or other metal tube and for drawing the tube into compressing contact with a seal. As discussed above, parent application Ser. No. 576,259 (now U.S. Pat. No. 5,655,797) proposed the use of a gripping ring that was notched so as to act like a collet to grip the tube and draw the tube into compressive engagement with the seal. However, this gripping ring proved somewhat difficult to manufacture and was relatively intolerant to variation in tube diameter. This particular problem is exacerbated by the fact that it is relatively difficult to hold tolerances when manufacturing the gripping ring. In addition, the notched gripping ring is less rigid then a traditional ferrule and hence is more likely to fail under movement or vibration.

Upon recognizing the problems associated with a gripping ring, the inventors attempted to cure these problems by replacing the gripping ring with a more standard ferrule. The first attempt involved the replacement of the gripping ring with a standard or "delrin" ferrule, otherwise known as a "SAE Style 'A'" ferrule. This ferrule is a tapered tubular structure that lacks any grooves or undercuts on its inner peripheral surface. Experiments with a delrin ferrule showed that it is difficult to swage the ferrule into gripping contact with the tube, that the ferrule is difficult to tighten, and that the ferrule grips the tube undesirably early in its inward travel stroke so that the tube draws so far towards the seal that it may cut or otherwise damage the seal.

The inventors attempted to solve this problem by replacing the standard or delrin seal with a less conventional SAE style "B" ferrule that has a square undercut at its inner axial end. This square undercut extends axially outwardly from the inner end such that the inner peripheral surface of the ferrule takes on a stepped appearance having a larger diameter at its outer end than at its inner end. The undercut allows the ferrule to be crushed for a longer period of time during the coupling operation before making contact with the tube wall, thus allowing for less inward travel of the tube and avoiding cutting or otherwise damaging the seal. While this design held pressure adequately, it required greater-than-desired turning of the hex nut to achieve the same resultant torque achieved with significant less turning of the same hex nut in conjunction with a standard ferrule. In addition, the aggregate inward travel of the tube obtained with the imposition of this resultant torque was so much less than that obtained with a delrin type ferrule that it was feared that adequate compression of the seal might not be obtained in all instances.

OBJECTS AND SUMMARY OF THE INVENTION

A primary object of the invention is to provide a sanitary fitting having an improved ferrule which facilitates use of the fitting by assuring adequate compression of the fitting's seal, without overcompressing and damaging the seal, upon the imposition of a reasonable magnitude of torque and a reasonable amount of locking mechanism actuation.

Another object of the invention is to provide a sanitary fitting which meets the first object of the invention and the ferrule of which is relatively easy to manufacture and yet can hold tight tolerances while tolerating significant variations in tube diameter.

Yet another object of the invention is to provide a sanitary fitting that is easy to install when compared to fittings employing complex locking rings or standard delrin-type ferrules.

Still another object of the invention is to provide a sanitary fitting incorporating a ferrule that is relatively rigid and thus is unlikely to fail under movements of vibrations likely to be encountered by the fitting.

In accordance with a first aspect of the invention, these objects are achieved by providing a sanitary fitting including at least a tubular body, a seal, and a metal ferrule. The tubular body includes an outer axial end portion which has an inner radial peripheral surface having a recess formed therein. The elastomeric seal is disposed in the recess in the end portion of the body and has an annular portion having inner and outer axial surfaces. The inner axial surface of the flange sealingly engages the shoulder of the body and the outer axial surface of the flange is sealingly engageable with the axial end of the tube. The metal ferrule surrounds the tube, grips the outer radial peripheral surface of the tube, and draws the axial end of the tube into sealing engagement with the outer axial surface of the annular portion of the seal. The ferrule is generally tubular in shape and has a) an outer axial end disposed remote from the seal, b) an inner axial end disposed nearer to the seal than the outer end, and c) a grooved undercut formed in an inner radial peripheral surface thereof. The grooved undercut is located axially between the outer end of the ferrule and the inner end of the ferrule and extends around the inner radial peripheral surface of the ferrule.

Preferably, the grooved undercut is generally C-shaped when viewed in transverse cross-section and includes 1) an outer leg which extends inwardly from the inner radial peripheral surface of the ferrule at an acute angle with respect to an axial centerline of the ferrule, 2) a center leg which extends from the outer leg generally in parallel with the axial centerline, and 3) an inner leg which extends outwardly from the center leg to the inner radial peripheral surface of the ferrule at an acute angle with respect to the axial centerline.

Still another object of the invention is to provide an improved ferrule usable in applications in which the ferrule draws a tube into compressive engagement with an annular seal.

This object is achieved by providing a ferrule having at least some of the characteristics described above.

Yet another object of the invention is to provide an improved method of assembling a fitting.

In accordance with another aspect of the invention, this object is achieved by providing 1) a tubular body comprising an outer axial end portion, an outer radial peripheral surface of the end portion being threaded and an inner radial peripheral surface of the end portion presenting an annular shoulder, 2) an elastomeric seal which includes an annular portion which presents an outer axial surface and an inner axial surface, and 3) a metal tube having an axial end. The assembly operation proper includes sliding a metal ferrule and a nut over the axial end of the tube, the nut having a threaded inner radial peripheral surface, the ferrule having a grooved undercut formed therein which extends around an inner radial peripheral surface thereof, and positioning the tube, the ferrule, and the nut such that the axial end of the tube and at least a portion of the ferrule are surrounded by the outer axial end portion of the body and such that the nut threadedly engages the body and the axial end of the tube engages the outer axial surface of the annular portion of the seal. The nut is threaded onto the body such that the nut moves axially with respect to the body and forces the ferrule to move axially with respect to the body and the tube to a position in which the body imposes a radial force on the ferrule that causes the ferrule to collapse about the grooved undercut by an amount sufficient to cause the inner end of the ferrule to grip the tube. The nut is then threaded further onto the body so that the ferrule draws the tube into a position in which the annular portion of the seal is compressed between the axial end of the tube and the annular shoulder of the body and in which the inner axial surface of the annular portion of the seal sealingly engages the shoulder of the body and the outer axial surface of the annular portion of the seal sealingly engages the axial end of the tube.

Preferably, the ferrule draws the tube through a distance of between 0.015" and 0.025" and the nut turns approximately ⅞ of a revolution with about 60 ft-lbs of torque being imposed on the nut by the end of the process.

Other objects, features, and advantages of the invention will become more readily apparent to those skilled in the art from the detailed description and the accompanying drawings. It should be understood, however, that the detailed description and the specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

1. Resume

Pursuant to the invention, a sanitary fitting is provided which 1) is relatively simple and inexpensive to fabricate and which is easy to assemble, 2) can withstand internal fluid pressures on the order of several thousand psi, and 3) provides a fluid-tight seal between the fitting and the axial end of the tube coupled to the fitting, thereby eliminating crevices between the end of the tube and the sealing point of the fitting and consequent fluid accumulation and potential bacteria growth. The fitting preferably includes a body having a recessed outer end, an elastomeric seal disposed in the recess in the body, and a locking mechanism which grips the tube and which draws the tube into a position in which it sealingly engages the seal and causes the seal to seal against an annular shoulder of the body. The locking mechanism includes a ferrule having a grooved undercut near its inner end that in use facilitates collapsing of the ferrule's inner end into gripping contact with the tube.

2. System Overview and First Fitting Construction

The inventive sanitary fitting could be used in virtually any tubing or piping system designed for the conveyance of liquids and is especially useful in systems conveying liquids subject to contamination by microbe or bacterial growth within pockets of liquids trapped in crevices or voids in the piping system. The versatility of the fitting's design is heightened by the fact that it is applicable to tubes or pipes ranging in diameter from ¼ inch or less to a diameter of several inches.

In the first embodiment illustrated in FIGS. 1–9, the inventive fitting 100 is used in a laboratory animal watering system 102 conveying distilled or otherwise purified drinking water to mice, rats, or other laboratory animals. The use of sanitary fittings is important in this type of system, not only because the animals' health may be adversely affected by microbe or bacterial growth within the watering system, but also because sickness resulting from the presence of bacteria or other microbes in such water may skew or even ruin the results of years of research. The system 102, used for instance to convey water to and/or within in a standard cage and rack system, includes several sections of tubes 104, 104' and a plurality of animal watering valves 106 (a separate valve 106 being provided for each cage on the rack.) Pursuant to the invention, the tubes 104, 104' are connected to one another and/or to the valves 106 by fittings 100, 100'. Two of the fittings 100, 100' are illustrated in a T-union 108, which also presents a nipple for the valve 106, it being understood that the fittings of the same design could and would be used in elbows, simple unions, and as all other fittings in the system in which a tube is joined with another tube and/or with a valve and/or hoses or other components of the system 102. The tubing system of the illustrated system is ½ O.D. rolled stainless steel tubing, it being understood that the fitting 100 could be used with virtually any tube of diameters considerably smaller or larger than that of the illustrated tubes 104, 104'. Since each of the fittings 100, 100' is identical in construction and operation, only the fitting 100 will be detailed.

Referring now to FIGS. 4, 5, 8, and 9, the sanitary fitting 100 of the first embodiment receives and seals against an axial end 112 of the tube 104. The fitting 100 includes a tubular body 114, an elastomeric seal 116, and a locking mechanism 117. In the illustrated and preferred embodiment, the locking mechanism 117 includes a gripping ring 118 and a hex nut 120. When the fitting 100 is in the assembled position illustrated in FIGS. 4 and 9, the gripping ring 118 engages the outer peripheral surface of the tube 104 and holds the tube 104 in a position in which the end 112 of the tube 104 is sealed against the elastomeric seal 116 and in which the elastomeric seal 116 is sealed against the body 114 without any voids or crevices being formed between the seal 116 and the tube 104 or between the seal 116 and the body 114, thereby preventing accumulation of fluids in the fitting 100 and consequent bacterial growth. Each of the major components of the fitting 100 will now be detailed.

Figure 8:
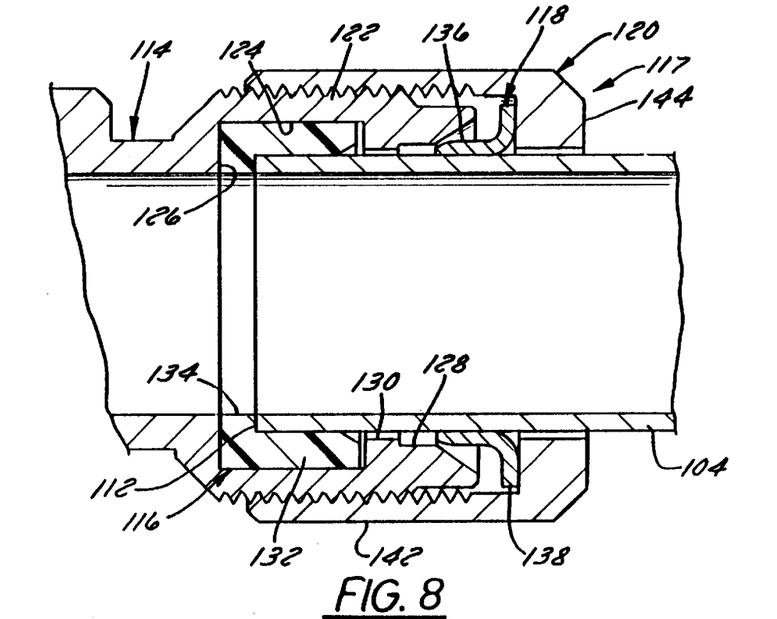
FIG. 8 is a sectional elevation view of one of the fittings of FIGS. 4 and 5 and of the associated end portion of the adjacent tube, illustrating the fitting in an intermediate stage of assembly.
Figure 9:
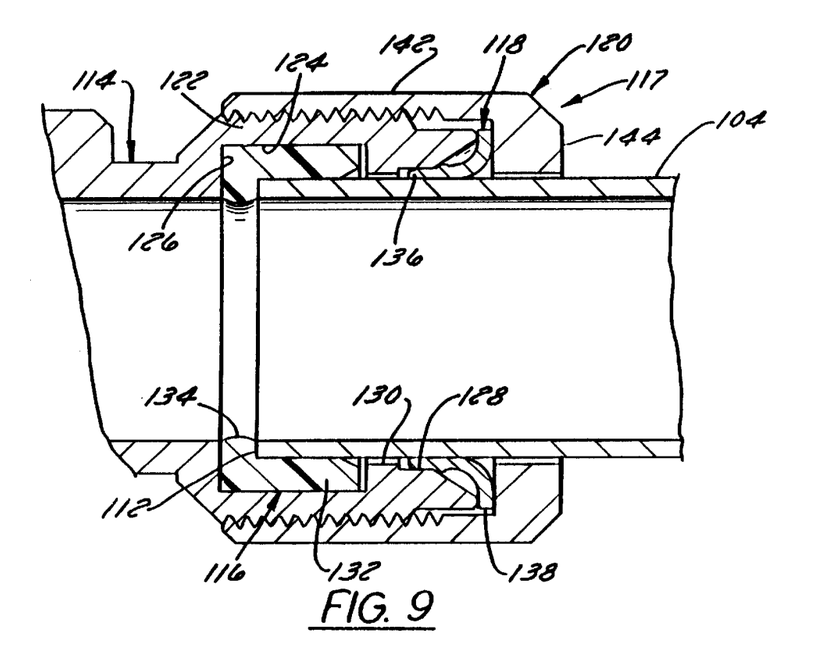
FIG. 9 corresponds to FIG. 8 and illustrates the fitting in a complete stage of assembly.

The tubular body 114 is formed from a single stainless steel element which has an outer axial end portion 122 for cooperation with the mating components of the fitting 100. A recess 124 is formed in the inner radial peripheral surface of end portion 122, with the inner axial end of the recess 124 presenting an annular shoulder 126. A stepped notch 128 is formed in the outer axial end of end portion 122 and is wider in cross section at an axial outer end thereof than at an axial inner end thereof. (It should be understood that "stepped" as used herein does not require a discrete step, but could include a wedge-shape.) A radial flange 130 projects inwardly from the inner radial peripheral surface of the body 114 so as to define an outer axial end of the recess 124 and an inner axial end of the stepped notch 128. The outer peripheral surface of the inner end portion 122 of the body 114 is threaded for reasons that will become apparent below.

The purpose of the elastomeric seal 116 is to provide a fluid-tight seal to both the shoulder 126 of the body 114 and the end 112 of the tube 104 while preventing fluid accumulation and consequent microbe or bacterial growth in the fitting 100. Preferably, the seal 116 is also designed to be fly maintained in the body 114 during assembly and to provide secondary seals both against the inner radial peripheral surface of the body 114 and the outer radial peripheral surface of the tube 104. This seal 116 is also preferably designed so as to provide the desired seal at the axial end 112 of the tube 104 without requiring precise machining of the tube.

Towards these ends, the seal 116 comprises an L-shaped tubular silicon rubber element which has an axial leg 132 and a radial leg 134 and which is dimensioned to fit snugly in the recess 124 in the body 114. The axial leg 132 of the seal 116 is significantly longer than the radial leg 134 and, in the assembled condition of the fitting 100 illustrated in FIGS. 4 and 9, seals against the inner peripheral surface of the body 114 and the outer peripheral surface of the tube 104. The radial leg 134 is formed from an inwardly projecting annular flange of the seal 116 and is of generally rectangular cross-section along substantially its entire radial length. An inner axial surface of the leg or flange 134 sealingly engages the shoulder 126 of the body 114, and an outer axial surface of the leg or flange 134 sealingly engages the axial end 112 of the tube 104. The radial length of the leg or flange 134 should be at least as great as the thickness of the tube 104 so that no crevice is formed between the tube 104 and the end of the flange 134. However, the leg or flange 134 preferably should not be significantly longer than the thickness of the tube 104 so that, in use, the inner radial peripheral surfaces of the body 114, flange 134, and tube 104 present a generally continuous cylindrical surface lacking any crevices where fluids may accumulate.

Figures 4, 6, 7:
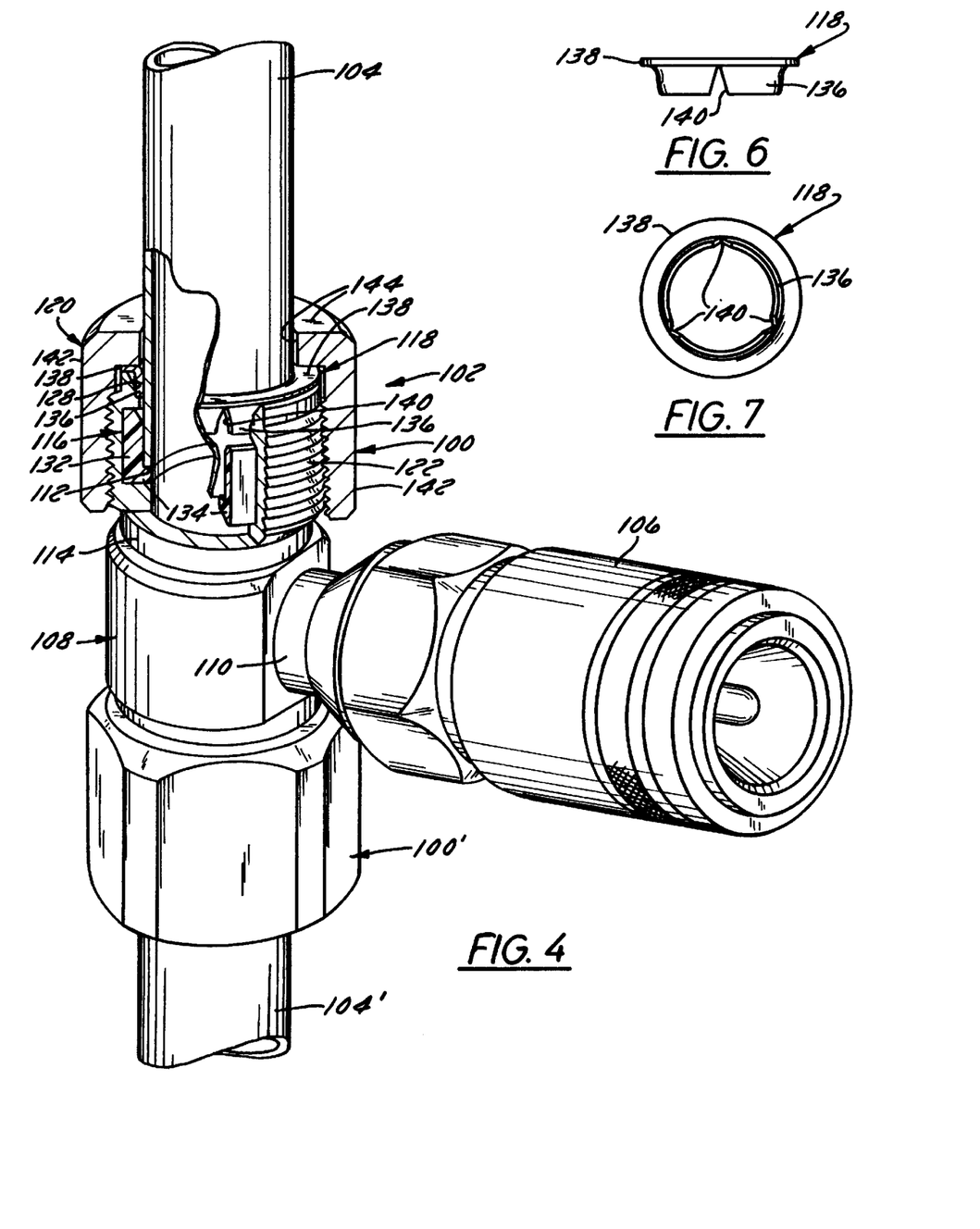
FIG. 4 is a partially cut away perspective view of a portion of a piping or tubing system employing fittings constructed in accordance with a first preferred embodiment of the present invention.
FIG. 6 is an elevation view of the gripping ring of one of the fittings of FIGS. 4 and 5.
FIG. 7 is an inner plan view of the gripping ring of FIG. 6.
Figure 5:
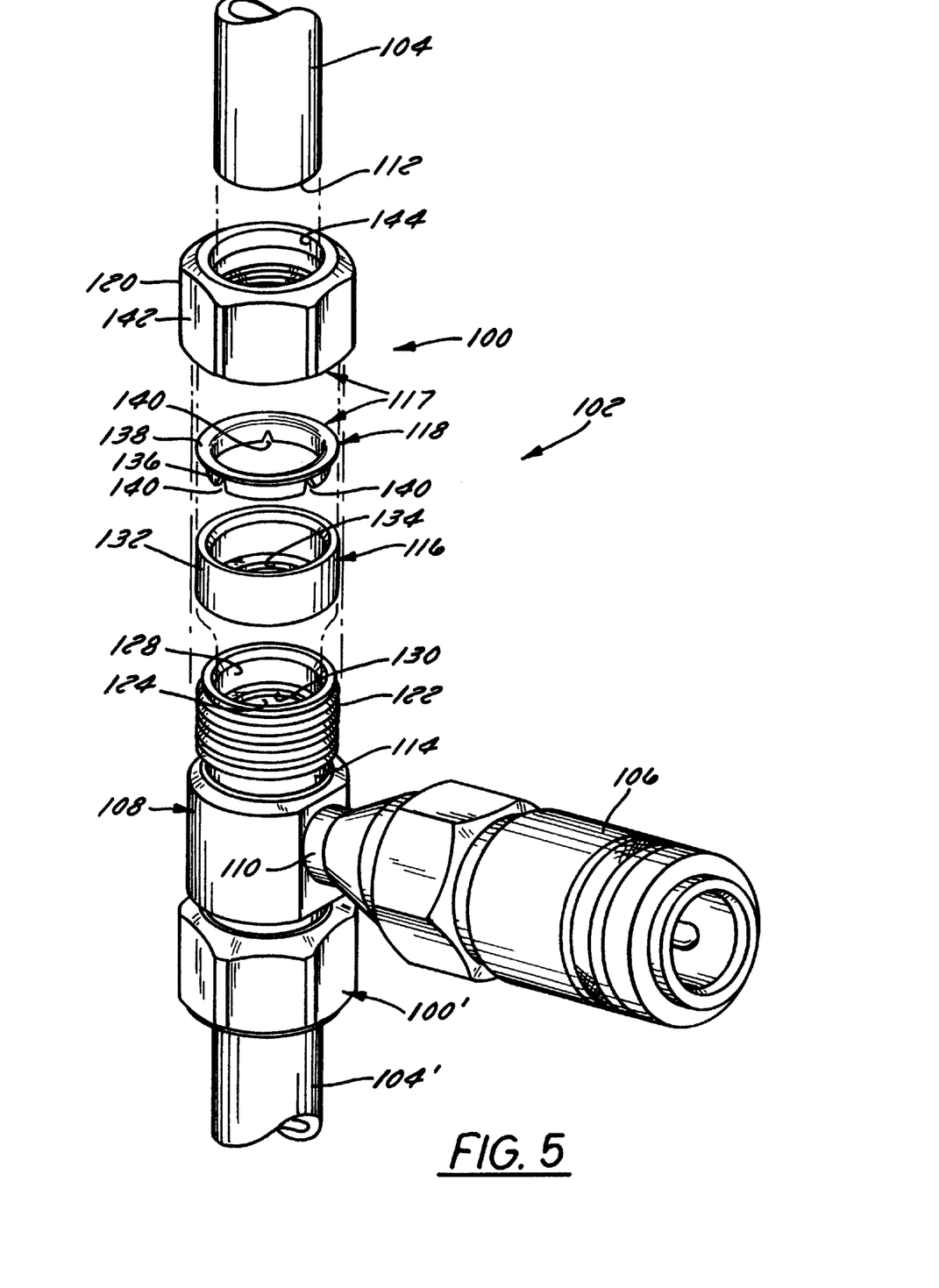
FIG. 5 is a perspective view of the piping system portion of FIG. 4, illustrating one of the fittings in an exploded perspective form.

The gripping ring 118 is designed to firmly grip the tube 104 and, upon tightening of the nut 120, to draw the tube 104 into the position illustrated in FIG. 9 in which the end 112 of tube 104 seals against the flange 134 on the elastomeric seal 116 without excessively deforming the seal 116. Referring particularly to FIGS. 6 and 7, the gripping ring 118 is formed from stamped stainless steel and includes a generally cylindrical portion 136 and an annular flange 138. The generally cylindrical portion 136 is disposed in the stepped notch 128 in the body 114 when the fitting 100 is in its assembled position illustrated in FIGS. 4 and 9 and functions to grip the tube 104 and draw its end 112 into sealing engagement with the seal 116. The annular flange 138 extends generally radially outwardly from the generally cylindrical portion 136 so as to engage the outer axial end surface of the body 114 when the fitting 100 is in its assembled condition. Referring again to FIGS. 6 and 7, a plurality (three in the illustrated embodiment) of generally V-shaped notches 140 are formed in the generally cylindrical portion 136 so as to extend from the inner axial end thereof towards the outer axial end thereof. The combined cross-sectional area of these notches 140 is smaller, indeed much smaller, than the combined cross sectional area of the remainder of the generally cylindrical portion 136. The notches 140 only need be large enough to permit the generally cylindrical portion 136 to deflect into gripping engagement with the outer peripheral surface of the tube 104. In many other similar devices, on the other hand, much larger notches are cut out to provide gripping fingers. In addition, the generally cylindrical portion 136 engages the outer radial peripheral surface of the tube 104 along substantially the entire length thereof. Accordingly, the gripping ring 118 presents a gripping area which is dramatically larger than gripping areas presented by other gripping rings of this general type. The gripping ring 118 accordingly acts like a collet in a lathe in that it imposes relatively high gripping forces on the tube 104, and the fitting 100 therefore can withstand significantly higher pressures than comparative prior art fittings. Indeed, while most commercial compression fittings which are currently available fail at pressures on the order of 250–500 psi, the inventive fitting 100 has withstood pressures in excess of 3,000 psi and can withstand pressures in excess of 2,000–2,500 psi for extended periods of time.

The nut 120 is a standard hex nut generally used in compression fittings. The nut has a tubular body 142 which is threaded on its inner radial peripheral surface. A flange 144 is formed on the outer axial end of the body 142 and extends generally radially inwardly from the body 142. The threaded inner radial peripheral surface of the body 142 engages the threaded outer radial peripheral surface of the body 114. An inner axial surface of the radial flange 144 engages the outer axial surface of the annular flange 138 on the gripping ring 118.

3. Assembly And Operation Of Sanitary Fitting of First Embodiment

Assembly of the fitting 100 is a relatively simple task. First, the tube 104 is provided. Its and 112 can be cut in a standard fashion and need not be excessively smooth. The seal 116 is placed in the recess 124 in the body 114, either by the user or by the manufacturer. The gripping ring 118 and hex nut 120 are then slid over the end 112 of the tube 104 such that the threads of the hex nut 120 face the threads on the body 114 and such that the generally cylindrical portion 136 of the gripping ring 118 faces the body 114. The tube 104 is free to slide axially with respect to the gripping ring 118 at this time because there is a slight clearance between the cylindrical portion 136 of the gripping ring 118 and the outer peripheral surface of the tube 104. The assembler therefore can slide the tube 104 into a position in which the end 112 of the tube 104 engages the seal flange 134. The outer peripheral surface of the tube 104 forms an interference fit with the inner peripheral surface of the axial leg 132 of the seal 116 at this time, thereby to form a fluid-tight seal.

The nut 120 is then threaded onto the body 114 to draw the gripping ring 118 further into the stepped notch 128 in the body 114. The gripping ring 118 moves axially with respect to the tube 104 until the outer end of the cylindrical portion 136 of the gripping ring 118 travels into the reduced diameter portion of the stepped notch 128 a sufficient distance to deflect into gripping engagement with the outer peripheral surface of the tube 104. The body 114, seal flange 134, stepped notch 128 in the body 114, and gripping ring 118 are dimensioned and configured such that threading the nut 120 further onto the body 114 draws the gripping ring 118 and the tube 104 to the position illustrated in FIG. 9 in which the radial flange 138 of the gripping ring 118 engages the outer axial end of the body 114 and in which the axial end 112 of the tube 104 compresses the flange 134 on the seal 116 sufficiently to assure a sealing engagement between it and the shoulder 126 of the body 114 and between it and the end 112 of the tube 104 without excessively deforming the seal 116 (the tube 104 moves about 0.010" during this motion). Accordingly, the above-described generally contiguous surface is formed along the inner peripheries of the body 114, seal flange 134, and tube 104 while simultaneously assuring that no crevices or voids are formed in the vicinity of the seal 116. Fluid accumulation and bacterial or other microbe growth which could otherwise occur are therefore avoided.

It can thus be seen that the inventive fitting 100 provides a remarkably simple and effective mechanism for providing a sanitary coupling between a tube 104 of a tubing or piping system 102 and other tubes and/or other components of the system. The design of the fitting 100 is flexible, being suitable for use with tubing or piping systems varying greatly in size, and is extremely strong, capable of withstanding pressures up to ten times higher then the failure pressure of comparable prior art fittings.

4. Construction, Assembly and Operation of Sanitary Fitting of Second Embodiment Referring now to FIGS. 10–16, a sanitary fitting 200 is illustrated that is constructed in accordance with a second preferred embodiment of the invention and that is usable with the animal watering system 104 described above in conjunction with the first embodiment. This fitting differs from the fitting 100 of the first embodiment primarily in that the gripping ring 118 has been replaced by a ferrule 218. Components of the fitting 200 of the second embodiment corresponding to components of the fitting 100 of the first embodiment are indicated by the same reference numerals, incremented by 100.

The fitting 200 includes a tubular body 214, an elastomeric seal 216, and a locking mechanism 217. The locking mechanism 217 includes a ferrule 218 and a hex nut 220. When the fitting 200 is in the assembled position illustrated in FIG. 16, the ferrule 218 engages the outer peripheral surface of a tube 204 and holds the tube 204 in a position in which its end 212 is sealed against the elastomeric seal 216 and in which the elastomeric seal 216 is sealed against the body 214 without any voids or crevices being formed between the seal 216 and the tube 204 or between the seal 216 and the body 214, thereby preventing any accumulation of fluids in the fitting 200 and consequent bacterial growth.

The tubular body 214, elastomeric seal 216, and hex nut 220 of the locking mechanism 217 remain generally unchanged when compared to the corresponding components of the first embodiment and hence will be only briefly described.

The tubular body 214 includes an outer axial end portion 222 and a recess 224 presenting an outwardly-facing annular shoulder 226. A radial flange 230 projects radially inwardly from the inner radial peripheral surface of the body 214 so as to define an outer axial end of the recess 224 and an inner axial end of the axial end portion 222. An inner radial peripheral surface 228 of the outer end portion 222 extends inwardly from the outer end to the radial flange 230 in a general frusto-conical manner so as to form a canted or ramped surface that is engaged by the outer radial peripheral surface 256 of the ferrule 218 upon nut tightening as detailed below.

The seal 216, like the seal 116 of the first embodiment, is composed of an L-shaped tubular silicon rubber element which has an axial leg 232 and a radial leg 234. The construction and dimensions of the legs 232 and 234 and their proportions relative to the remaining components are the same as discussed above in connection with the first embodiment.

The nut 220 is a standard hex nut generally used in compression fittings. The nut 220 includes an internally-threaded tubular body 242 and a flange 244. The flange 244 has an inner axial surface that engages the outer axial end of the ferrule 218.

The ferrule 218 differs significantly from the gripping ring 118 of the first embodiment. The ferrule 218 is designed to be easier to manufacture than the gripping ring of the first embodiment while holding tighter tolerances and at the same time being able to accommodate greater variations in tube diameter then can be accommodated by the gripping ring of the first embodiment. It also is designed to require the imposition of less torque on the nut 220 during the tightening process so as to make the fitting 200 easier to assemble than the fitting of the first embodiment while at the same time providing a more rigid assembly that is less likely to fail under movement or vibration.

Figure 10:
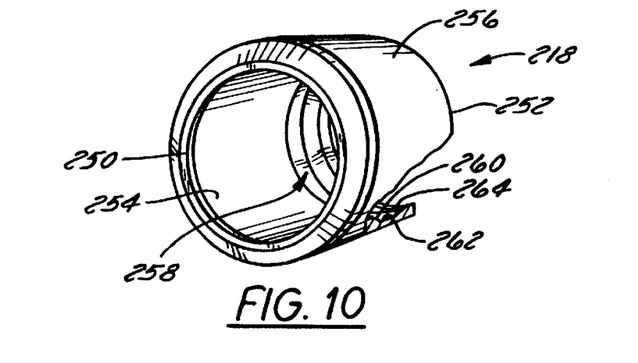
FIG. 10 is a partially cut-away perspective view of a ferrule usable in a sanitary fitting constructed in accordance with a second preferred embodiment of the invention.
Figure 11:
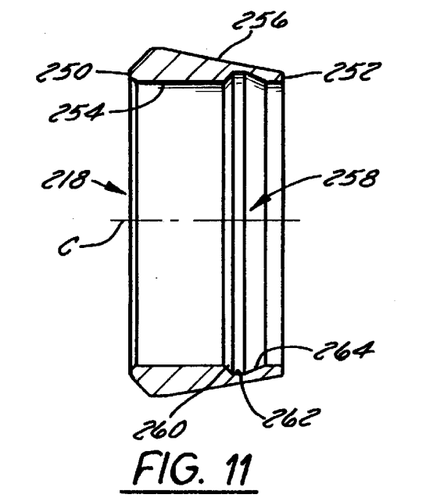
FIG. 11 is a sectional side elevation view of the ferrule of FIG. 10.
Figure 12:
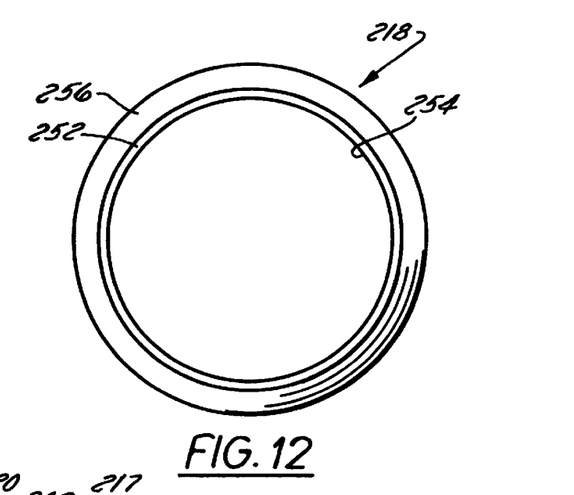
FIG. 12 is an end view of the ferrule of FIGS. 10 and 11.

Towards these ends, the ferrule 218 includes a tubular body that is formed from a metallic material that is sufficiently heat resistant to permit the ferrule 218 to undergo autoclaving or similar processes and that is resistant to corrosion from water or other fluids flowing therethrough. Stainless steel is preferred. Ferrule 218 has an inner radial peripheral surface 254 and an outer radial peripheral surface 256. The inner surface 254 extends axially, while the outer surface 256 is tapered inwardly from an outer end 250 of the ferrule 218 to an inner end 252. The angle of this taper is less than the angle of the taper of the canted surface 228 of the body 214 so that the inner end 252 engages the surface 228 as the ferrule 218 travels axially inwardly with respect to the body 214. The outer end 250 is chamfered to prevent it from digging into the flange 244 of the hex nut 220 upon fitting assembly.

A grooved undercut 258 is formed in the inner radial peripheral surface 254 of the ferrule 218, preferably by being machined into an otherwise-finished ferrule using a CNC tool or the like. The undercut 258 preferably is located between the outer end 250 of the ferrule 218 and the inner end 252 and even more preferably is located near the inner end 252. The grooved undercut 258 is designed to act as a hinge in use that permits the inner end 252 of the ferrule 218 to bend or collapse into gripping contact with the tube 204 when the hex nut 220 is tightened to force the slanted outer surface 256 of the ferrule 218 into contact with the slanted surface 228 of the body 214. The undercut 258 is preferably generally C-shaped when viewed in transverse cross-section so as to have an outer leg 260, a center leg 262, and an inner leg 264. The center leg 262 extends generally in parallel with an axial centerline C of the ferrule 218, while the outer and inner legs 260 and 264 extend at acute angles with respect to this axial centerline. These angles are selected to promote collapsing of the ferrule inner end 252 upon contact with the ramped surface 228 of the tubular body 214. Hence, the outer leg 260 extends inwardly from the inner surface 254 at a first angle and the inner leg 264 extends inwardly from the inner surface 254 at a second angle that is smaller than the first angle. The first angle is preferably approximately 45°, and the second angle is preferably approximately 25°.

The depth, size, and location of the undercut 258 also are selected to maximize its ability to act as a hinge while retaining rigidity and stability of the ferrule 218. In the illustrated embodiment in which the ferrule 218 is designed for use with a ½" OD tube 204, the ferrule 218 has an overall axial length of approximately 0.267" with the innermost end of the undercut 258 being located approximately 0.028" from the inner end 252. The grooved undercut 258 has a depth of approximately 0.017" and a length from the outer end of the outer leg 260 to the inner end of the inner leg 264 of about 0.057".

Figure 13:
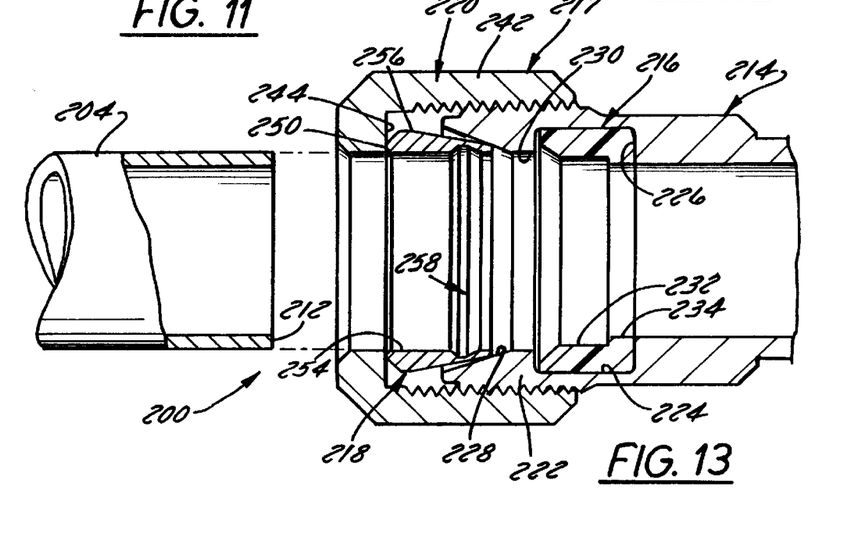
FIGS. 13–16 are sectional side elevation views illustrating the sequence of assembling a sanitary fitting constructed in accordance with the second embodiment of the invention.

The fitting 200 of the second embodiment is assembled in much the same manner as the fitting 100 of the first embodiment. First, a preassembly operation is performed either at the factory or prior to final assembly. This preassembly operation begins by placing the seal 216 in the recess 224 in the body 214. The ferrule 218 and hex nut 220 may then be positioned on the end of the body 214 such that the ferrule 218 is in loose engagement with the ramped surface 228 of the body 214 and such that the hex nut 220 is hand-threaded loosely onto the threaded end of the body 214 as seen in FIG. 13.

Figure 14:
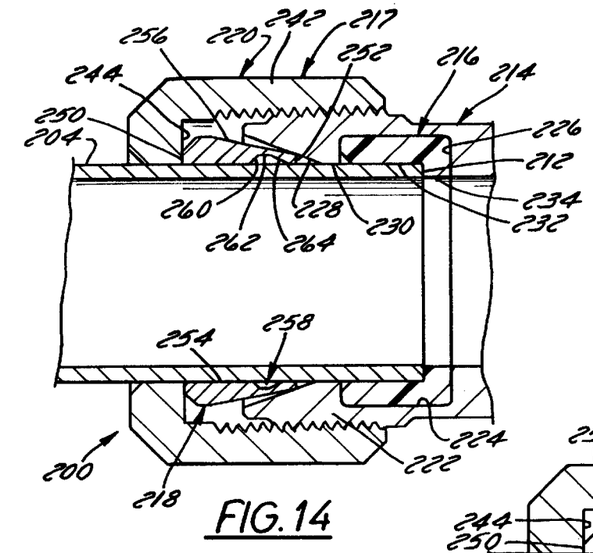
Figure 15:
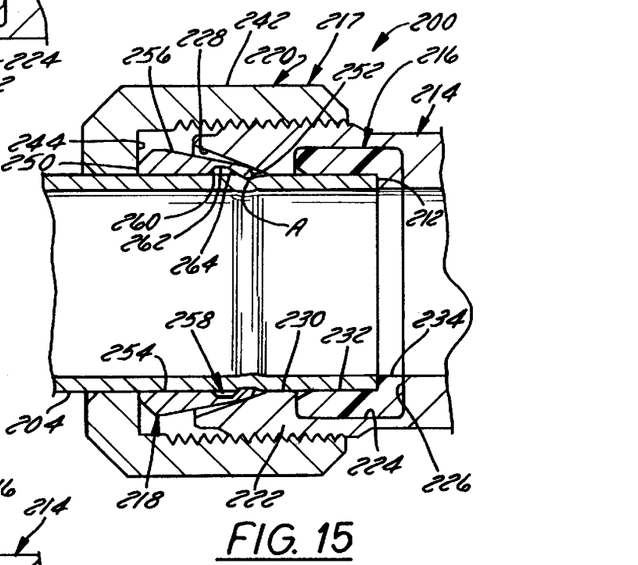

Then, a tube 204 is provided which has been previously de-burred sufficiently to remove all burs and sharp edges from its end 212, although the tube 204 need not be extraordinarily smooth. The bur-free tube 204 is inserted into the fitting 200 until the end 212 of the tube 204 engages the seal flange 234 as seen in FIG. 14. Next the hex nut 220 is tightened, first by hand and then with a conventional wrench, so that the flange 244 on the hex nut 220 engages the outer end 250 of the ferrule 218 and drives the ferrule inwardly into contact with the ramped surface 228 on the tubular body 214. As a result of this contact, the inner end 252 of the ferrule 218 collapses about the grooved undercut 258 and grips the tube 204 at point A as seen in FIG. 15. The end 212 of the tube 204 is firmly held against the outer surface of the seal flange 234 at this time. Finally, the hex nut 220 is turned an additional ¼ to ½ revolution to force the ferrule 218 and hence the tube 204 inwardly to the position seen in FIG. 16 in which the seal flange 234 is compressed by about 0.10" to 0.025", thereby promoting a positive seal between the radial end 212 of the tube 204 and the seal flange 234. The above-described void-free seal therefore is obtained. Contact between the outer peripheral surface 256 of the ferrule 218 and the ramped surface of the tubular body 214 at this time also forms in a secondary seal S that prevents the fitting 200 from leaking should the elastomer seal 216 fail.

Figure 16:
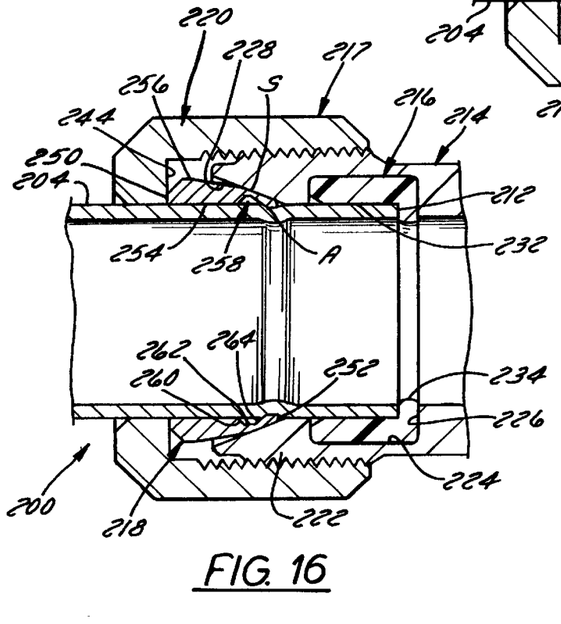

The ferrule 218 and tube 204 travel inwardly an aggregate distance of about 0.010" to 0.025" during the tightening operation, i.e., when they move from the position illustrated in FIG. 14 to the position illustrated in FIG. 16, and the nut 220 is turned about ⅞ of a revolution. The distance of inward travel is important because significantly less travel, i.e., on the order of 0.015" or less, might not adequately compress the seal flange 234 to form an acceptable seal, and because significantly more travel, i.e., more than 0.025", might cut or damage the seal flange 234. These characteristics were made possible by the grooved undercut 258 that 1) translates some of the axial motion of the ferrule 218 into radial collapsing motion so as to avoid ferrule overtravel, 2) assures excellent swaging or bending of the ferrule end 252 into tight gripping contact with the tube 204, and 3) requires lower torque to drive the ferrule 218 a designated distance then would be required by a standard delrin ferrule.

The benefits of the ferrule 218 when compared to a standard delrin ferrule or a ferrule having a square undercut of the type described in the "Background" section above can be appreciated with reference to Table 1:

TABLE 1

| Ferrule style | Inward Travel | Turns to 60 ft-lb | Swaged Ferrule | Seal Damage |
|---|---|---|---|---|
| Standard Shaped | 0.0246" | ¾ Turn | Loose | Yes |
| Square Undercut | 0.0156" | 1 Turn | Tight | No |
| Grooved Cut | 0.0200" | ⅞ Turn | Tight | No |

As can be appreciated from this Table, the inventive ferrule 218 having the grooved undercut 258 tightens into gripping contact with the tube 204 with less nut revolution than is required by a more conventional square undercut, but avoids the seal damage that might occur with respect to a standard or delrin ferrule. In short, the ferrule 218 having a grooved undercut 258 exhibits some or most of the advantages of both a standard ferrule and a square undercut ferrule. That is, like a standard ferrule but unlike a ferrule having a square undercut, the ferrule 218 and tube 204 travel inwardly an adequate distance without having to turn the nut a great deal. On the other hand, like a square undercut ferrule but unlike a standard or delrin ferrule, the inventive ferrule is relatively easy to tighten into swaged contact with the tube 204 and exhibits no danger of overtravel that could lead to seal flange damage.

It should be noted at this point that while the ferrule 218 is ideally suited for use with the fitting 200 and that an improved fitting is thus obtained, the ferrule 218 is not limited for use with such a fitting. It could instead be used with any fitting in which the purpose of the ferrule 218 is to grip a tube and to draw it into sealing engagement with an annular seal.

Many changes and modifications, other than those discussed above, could be made to the disclosed fitting without departing from the spirit of the present invention. For instance, the illustrated hex nut of the locking mechanism could be replaced by clamps or other devices capable of drawing the tube and the gripping ring or ferrule or a comparable gripping device into the required location and subsequently retaining them in place. Moreover, the body, seal, and gripping ring or ferrule could all have different configurations so long as the primary goals of the invention are met. The scope of these and other changes will become apparent from the appended claims.

We claim:

1. In combination:

(A) a tube having an inner radial peripheral surface, an outer radial peripheral surface, and an axial end; and (B) a sanitary fitting including (1) a tubular body having an outer axial end portion, said outer axial end portion having an inner radial peripheral surface which has a recess formed therein which presents an axial shoulder;

(2) an elastomeric seal which is disposed in said recess in said end portion of said body and which has an annular portion, said annular portion having inner and outer axial surfaces, said inner axial surface of said annular portion sealingly engaging said shoulder of said body and said outer axial surface of said annular portion being sealingly engageable with said axial end of said tube; and (3) a metal ferrule which surrounds said tube and which grips said outer radial peripheral surface of said tube and draws said axial end of said tube into axial compressive sealing engagement with said outer axial surface of said annular portion of said seal, wherein said ferrule is generally tubular in shape and has a) an outer axial end disposed remote from said seal, b) an inner axial end disposed nearer to said seal than said outer end, and c) a grooved undercut formed in an inner radial peripheral surface thereof, said grooved undercut being located axially between said outer axial end of said ferrule and said inner axial end of said ferrule and extending around said inner radial peripheral surface of said ferrule.

2. A combination as defined in claim 1, wherein said grooved undercut is generally C-shaped when viewed in transverse cross-section.

3. A combination as defined in claim 2, wherein said grooved undercut includes 1) an outer leg which extends inwardly from said inner radial peripheral surface of said ferrule at an acute angle with respect to an axial centerline of said ferrule, 2) a center leg which extends from said outer leg generally in parallel with said axial centerline, and 3) an inner leg which extends outwardly from said center leg to said inner radial peripheral surface of said ferrule at an acute angle with respect to said axial centerline.

4. A combination as defined in claim 3, wherein said outer leg of said grooved undercut extends at a first acute angle and said inner leg of said grooved undercut extends at a second acute angle that is smaller than said first acute angle.

5. A combination as defined in claim 4, wherein said first acute angle is approximately 45° and said second acute angle is approximately 25°.

6. A combination as defined in claim 1, wherein said grooved undercut is located proximate to but spaced from said inner axial end of said ferrule.

7. A fitting as defined in claim 1, wherein said seal is generally L-shaped and has an inwardly-projecting annular flange forming said annular portion of said seal, said flange (1) having an inner radial peripheral surface which sealingly engages said shoulder of said body and (2) extending radially inwardly a sufficient distance to abut against said shoulder and said axial end of said tube so as to completely eliminate crevices between said flange, said shoulder, and said axial end of said tube where fluids may accumulate.

8. A combination as defined in claim 1, wherein said ferrule is formed from stainless steel.

9. A combination as defined in claim 1, wherein said outer axial end portion of said tubular body presents a ramped inner axial surface that is engaged by said inner end of said ferrule and that forces said inner axial end of said ferrule into gripping contact with said tube upon axial movement of said ferrule relative to said tubular body.

10. A combination as defined in claim 1, further comprising a retaining device which surrounds said tube, said ferrule, and said body and which locks said tube, said ferrule, and said body in position with respect to one another.

11. In combination:
   (A) a tube having an inner radial peripheral surface, an outer radial peripheral surface, and an axial end; and
   (B) a sanitary fitting including
      (1) a tubular body having an outer axial end portion, said outer axial end portion having an inner radial peripheral surface which has a recess formed therein, said recess having an outer radial wall and first and second axial end walls extending radially inwardly from said outer radial wall, said first axial end wall presenting an annular shoulder;
      (2) an L-shaped tubular elastomeric seal which is disposed in said recess in said end portion of said body and which has an inwardly-projecting annular flange, said flange having inner and outer axial surfaces and having an inner radial peripheral surface, said inner axial surface of said flange sealingly engaging said shoulder of said body and said outer axial surface of said flange being sealingly engaged and axially compressed by said axial end of said tube, said flange extending radially inwardly a sufficient distance to abut against said shoulder and said axial end of said tube so as to completely eliminate crevices between said flange, said shoulder, and said axial end of said tube where fluids may accumulate; and
      (3) a locking mechanism which includes
         (a) a metal ferrule which surrounds said tube and which grips said outer radial peripheral surface of said tube and draws said axial end of said tube into sealing engagement with said outer axial surface of said annular flange of said seal, wherein said ferrule is generally tubular in shape and has a) an outer axial end disposed remote from said seal, b) an inner axial end disposed nearer to said seal than said outer end, and c) a grooved undercut formed in an inner radial peripheral surface thereof, said grooved undercut being located axially between said outer axial end of said ferrule and said inner axial end of said ferrule and extending around the inner radial peripheral surface of said ferrule; and
         (b) a retaining device which surrounds said tube, said ferrule, and said body and which locks said tube, said ferrule, and said body in position relative to one another.

12. A metal ferrule which is generally tubular in shape and which has 1) an outer axial end, 2) an inner axial end, and c) a grooved undercut formed in an inner radial peripheral surface thereof, said grooved undercut being located axially between said outer axial end and said inner axial end and extending around the inner radial peripheral surface of said ferrule, wherein
   said grooved undercut is generally C-shaped when viewed in transverse cross-section and includes 1) an outer leg which extends inwardly from said inner radial peripheral surface at an acute angle with respect to an axial centerline of said ferrule, 2) a center leg which extends from said outer leg generally in parallel with said axial centerline, and 3) an inner leg which extends outwardly from said center leg to said inner radial peripheral surface at an acute angle with respect to said axial centerline, wherein
   said grooved undercut is located proximate to but spaced from said inner axial end, and wherein
   said ferrule has an axial length of approximately 0.267", said grooved undercut has an axial length of approximately 0.085", and said inner axial end extends axially about 0.028" beyond an inner end of said inner leg of said grooved undercut.

13. A ferrule as defined in claim 12, wherein said outer leg of said grooved undercut extends at a first acute angle and said inner leg of said grooved undercut extends at a second acute angle that is smaller than said first acute angle.

14. A ferrule as defined in claim 13, wherein said first acute angle is approximately 45° and said second acute angle is approximately 25°.

15. A ferrule as defined in claim 12, wherein said ferrule is formed from stainless steel.

16. In combination:
   (A) a tube having an inner radial peripheral surface, an outer radial peripheral surface, and an axial end; and
   (B) a sanitary fitting including (1) a tubular body having an outer axial end portion, said outer axial end portion having an inner radial peripheral surface which has a recess formed therein which presents an axial shoulder;
(2) an elastomeric seal which is disposed in said recess in said end portion of said body and which has an annular portion, said annular portion having inner and outer axial surfaces, said inner axial surface of said annular portion sealingly engaging said shoulder of said body and said outer axial surface of said annular portion being sealingly engageable with said axial end of said tube; and
(3) a metal ferrule which surrounds said tube and which grips said outer radial peripheral surface of said tube and draws said axial end of said tube into compressive sealing engagement with said outer axial surface of said annular portion of said seal, wherein said ferrule is generally tubular in shape and has a) an outer axial end disposed remote from said seal, b) an inner axial end disposed nearer to said seal than said outer end, and c) a grooved undercut formed in an inner radial peripheral surface thereof, said grooved undercut being located axially between said outer axial end of said ferrule and said inner axial end of said ferrule and extending around said inner radial peripheral surface of said ferrule, wherein said grooved undercut is located proximate to but spaced from said inner axial end of said ferrule, and wherein said ferrule has an axial length of approximately 0.267", said grooved undercut has an axial length of approximately 0.085", and said inner axial end of said ferrule extends axially about 0.028" beyond an inner end of said grooved undercut.

* * * * *